United States Patent [19]

Tomko et al.

[11] Patent Number: 4,759,992

[45] Date of Patent: Jul. 26, 1988

[54] PROCESS FOR COATING MOISTURE-CURABLE LOW MOLECULAR WEIGHT POLYMERS AND COMPOSITES THEREOF

[75] Inventors: Richard F. Tomko, Homewood, Ill.; William D. Sigworth, Naugatuck, Conn.; Thomas S. Coolbaugh, Arlington, Mass.

[73] Assignee: Uniroyal Chemical Company, Inc., Middlebury, Conn.

[21] Appl. No.: 905,819

[22] Filed: Sep. 10, 1986

[51] Int. Cl.$^4$ .......................... B32B 9/04; B05D 3/02
[52] U.S. Cl. ..................... 428/447; 427/387; 427/389.9; 427/393; 427/393.6; 428/451; 428/452; 428/454
[58] Field of Search ............... 525/242, 288, 64, 69; 427/387, 393, 393.6, 389.9; 428/447

[56] References Cited

U.S. PATENT DOCUMENTS

| | | | |
|---|---|---|---|
| 3,366,612 | 1/1968 | Baldwin et al. | 260/85.3 |
| 3,503,943 | 3/1970 | Kresge et al. | 260/80.7 |
| 3,644,315 | 2/1972 | Gardner et al. | 260/85.3 |
| 3,646,155 | 2/1972 | Scott | 260/827 |
| 3,810,775 | 5/1974 | Uhl | 427/387 X |
| 4,028,483 | 6/1977 | Bond, Jr. et al. | 526/279 |
| 4,048,129 | 9/1977 | Voigt | 525/288 |
| 4,117,195 | 9/1978 | Swarbrick et al. | 428/379 |
| 4,340,689 | 7/1982 | Joffrion | 525/263 |
| 4,396,751 | 8/1983 | Kampf et al. | 525/288 X |
| 4,412,042 | 10/1983 | Matsuura et al. | 525/288 X |

FOREIGN PATENT DOCUMENTS 0183493 6/1986 European Pat. Off.
54-145785 11/1979 Japan.

OTHER PUBLICATIONS

"Moisture-Curable Silane Grafted Ethylene Propylene Elastomers", (G. Wouters and F. Woods), International Rubber Conference, 1981, Harrogate, U.K.

*Primary Examiner*—Thurman K. Page
*Attorney, Agent, or Firm*—William E. Dickheiser

[57] ABSTRACT

Amorphous moisture-curable, silane-substituted polymers having a saturated carbon backbone and a viscosity average molecular weight of between about 500 and about 20,000 provide desirable protection for weatherable substrates upon curing. Also disclosed are coating compositions containing such silane-substituted polymers; a method of protecting weatherable substrates employing such compositions; and composites produced by the method disclosed herein.

18 Claims, No Drawings

PROCESS FOR COATING MOISTURE-CURABLE LOW MOLECULAR WEIGHT POLYMERS AND COMPOSITES THEREOF

FIELD OF THE INVENTION

This invention relates to novel low molecular weight, amorphous silane-substituted polymers having a saturated carbon backbone which polymers are moisture curable and which, upon curing, provide desirable protection for weatherable substrates. In other aspects, this invention is directed to compositions comprising such polymers as well as to composite comprised of cured compositions and a weatherable substrate. In yet another aspect, this invention is directed to a method of protecting weatherable substrates.

BACKGROUND OF THE INVENTION

The protection of weatherable substrates has long been a desired goal. The ideal weatherable coating composition will provide desirable protection against the elements, will not discolor or otherwise mar the appearance of the surface to be protected, and will sufficiently fill holes and bridge gaps in irregularly surfaced substrates. Moreover, such a sealant composition must be readily applied and cured.

Among the polymeric materials which have been employed in the past for the protection of weatherable substrates are certain moisture-curable high molecular weight silane-grafted rubbery polymers. Thus, for example, Kresge et al (in U.S. Pat. No. 3,503,943) show moisture-curable silane-grafted copolymers having an ethylene/propylene/nonconjugated diene backbone, which polymers may be employed to form a waterproof protective layer. It is noteworthy that all the graft copolymers actually made by Kresge et al have an inherent viscosity of more than 2.0 dl/g in tetralin and thus possess molecular weights of more than about 90,000.

Somewhat similarly, Gardner et al (in U.S. Pat. No. 3,644,315) show moisture-curable silane-grafted conjugated diolefin polymers having at least 0.5 mole percent unsaturation in their backbones. It is to be noted that the lowest molecular weight of any backbone polymer shown in the examples of Gardner et al is more than 40,000. See also U.S. Pat. No. 3,646,155 to Scott, which shows the use of silane grafting to crosslink high molecular weight polyethylene resins.

Although Kresge et al and Gardner et al, discussed above, do state that lower molecular weight backbone polymers may be employed, these patents do not exemplify this statement. In this regard, the conclusions of the survey article presented by G. Wouters and F. Woods entitled "Moisture-Curable Silane Grafted Ethylene Propylene Elastomers" and presented at the International Rubber Conference 1981, Harrogate, U.K.—i.e., almost 10 years after the issuance of the Kresge et al and Gardner et al patents—is extremely noteworthy. Specifically, in Table 5 of their presentation, Wouters et al conclude that "EPM's or EPDM's with low molecular weight" are "structures with low moisture-curing potential."

A second class of polymeric materials which have been employed to produce moisture-curable sealants are silane-grafted halogenated copolymers. Thus, Baldwin et al (in U.S. Pat. No. 3,366,612) show certain halogenated polymeric compositions which have been reacted with silanes to form materials useful as waterproof, weather-resistant liners. Somewhat similarly, Bond, Jr. et al (in U.S. Pat. No. 4,028,483) show interpolymers of ethylene, propylene and an ethylenically unsaturated silane substituted with a "highly hydrolyzable group" (in all examples a halogen or halogenated group).

A third class of moisture-curable polymers which have been disclosed as being useful for the protection of certain substrates (e.g., metal, glass or plastic fibers) from adverse environmental conditions are low molecular weight silane-modified waxes. Thus, Inakaki et al (in Japanese Patent Disclosure No. 1979-145785) show low molecular weight silane-grafted waxes which are suitable for fabrication by casting above their melt temperature of 80°–160° C.

In addition, Joffrion (in U.S. Pat. No. 4,340,689) and Swarbrick et al (in U.S. Pat. No. 4,117,195) show methods of grafting silanes onto ethylene/alphaolefin copolymers.

While all three types of polymers discussed above will provide some degree of protection to certain weatherable substrates, there are drawbacks associated with the uses of each. Thus, high molecular weight polymers will not desirably penetrate into porous substrates and, upon evaporation of the solvent required for their application, are prone to contraction thereby leaving portions of the substrates unprotected.

Halogenated polymers (which, if of high molecular weight will additionally possess the drawbacks disclosed above) liberate mineral acids, frequently potent acids such as hydrochloric acid, upon curing. Such acids may discolor the protective coating or even attack the substrate itself.

Waxes possess the disadvantage that they must be heated above their melt temperature of 80°–120° C. before being employed. Not only do such high temperatures cause difficulty in application, but they may harm the substrate to be protected as well.

Thus, it would be highly desirable to possess a coating composition which could be easily applied, would exhibit good penetration of porous substrates and which would not impair the appearance of the substrate to be protected.

Accordingly, it is an object of this invention to provide a coating composition which is easily applied and which will not impair the appearance of the substrate to be protected.

It is a further object of this invention to provide a coating composition which exhibits desirable penetration into porous substrates and which does not require the use of large amounts of solvent.

It is another object of this invention to provide a novel silane-substituted polymer which is useful in coating compositions.

It is yet another object of this invention to provide a method of protecting a weatherable substrate.

It is another object of this invention to provide a composite comprised of a weatherable substrate and a protective polymeric layer.

These objects, and other additional objects, will become more fully apparent from the following description and accompanying Examples.

DESCRIPTION OF THE INVENTION

In one aspect, this invention relates to an amorphous polymer comprising a saturated carbon backbone having substituted thereon one or more silane moieties of the formula:

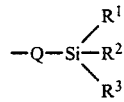

wherein
R[1] is: $C_1$-$C_{12}$ alkoxy, $C_1$-$C_{12}$ alkyleneoxy, $C_4$-$C_{12}$ alkoxyalkoxy, $C_5$-$C_6$ cycloalkoxy, $C_6$-$C_9$ aryloxy, $C_2$-$C_{13}$ alkylcarbonyloxy or $C_1$-$C_{12}$ alkylamino;
R[2] and R[3] are the same or different and are: hydrogen, $C_1$-$C_{12}$ alkoxy, $C_1$-$C_{12}$ alkyleneoxy, $C_4$-$C_{12}$ alkoxyalkoxy, $C_5$-$C_6$ cycloalkoxy, $C_2$-$C_{13}$ alkylcarbonyloxy, $C_1$-$C_{12}$ alkylamino, $C_1$-$C_{12}$ alkyl, $C_4$-$C_{12}$ alkoxyalkyl, $C_5$-$C_6$ cycloalkyl or $C_7$-$C_9$ aralkyl; and
Q is $C_2$-$C_6$ alkenylene, $C_5$-$C_8$ cycloalkylene, $C_5$-$C_8$ cycloalkenylene or of the formula:

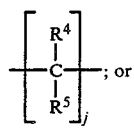  (I)

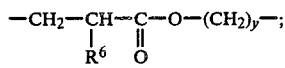  (II)

wherein j is a whole number between 0 and 6 inclusive; R[4] and R[5] are each independently hydrogen or $C_1$-$C_3$ alkyl; R[6] is hydrogen or methyl; and y is an integer between 2 and 5 inclusive; with the proviso that j can be 0 or 1 only if the saturated carbon backbone had pendent unsaturation prior to being substituted with such silane moiety;
said polymer having a viscosity average molecular weight of between about 500 and about 20,000.

In another aspect, this invention is directed to a sealant composition comprised of:
(A) an amorphous polymer comprising a saturated carbon backbone having substituted thereon one or more silane moieties of the formula:

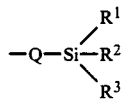

wherein
R[1] is: $C_1$-$C_{12}$ alkoxy, $C_1$-$C_{12}$ alkyleneoxy, $C_4$-$C_{12}$ alkoxyalkoxy, $C_5$-$C_6$ cycloalkoxy, $C_6$-$C_9$ aryloxy, $C_2$-$C_{13}$ alkylcarbonyloxy or $C_1$-$C_{12}$ alkylamino;
R[2] and R[3] are the same or different and are: hydrogen, $C_1$-$C_{12}$ alkoxy, $C_1$-$C_{12}$ alkyleneoxy, $C_4$-$C_{12}$ alkoxyalkoxy, $C_5$-$C_6$ cycloalkoxy, $C_2$-$C_{13}$ alkylcarbonyloxy, $C_1$-$C_{12}$ alkylamino, $C_1$-$C_{12}$ alkyl, $C_4$-$C_{12}$ alkoxyalkyl, $C_5$-$C_6$ cycloalkyl or $C_7$-$C_9$ aralkyl; and
Q is $C_2$-$C_6$ alkenylene, $C_5$-$C_8$ cycloalkylene, $C_5$-$C_8$ cycloalkenylene or of the formula:

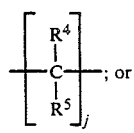  (I)

-continued
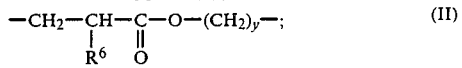  (II)

wherein j is a whole number between 0 and 6 inclusive; R[4] and R[5] are each independently hydrogen or $C_1$-$C_3$ alkyl; R[6] is a hydrogen or methyl; and y is an integer between 2 and 5 inclusive; with the proviso that j can be 0 or 1 only if the saturated carbon backbone had pendent unsaturation prior to being substituted with the silane moiety;
said polymer having a viscosity average molecular weight of between about 500 and about 20,000;
(B) between 0 and about 300 parts by weight, per 100 parts by weight of component (A), of a filler; and
(C) between 0 and about 10,000 parts by weight, per 100 parts by weight of component (A), of an inert diluent;
with the proviso that a total of at least about 1 part by weight of (B) plus (C) per 100 parts by weight of (A) is present.

In a further aspect, this invention is directed to a method for protecting a weatherable substrate, which method comprises the steps:
(a) providing a weatherable substrate;
(b) applying to at least a portion of said weatherable substrate a moisture-curable composition comprised of:
(A) an amorphous polymer comprising a saturated carbon backbone having substituted thereon one or more silane moieties of the formula:

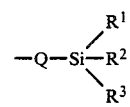

wherein
R[1] is: $C_1$-$C_{12}$ alkoxy, $C_1$-$C_{12}$ alkyleneoxy, $C_4$-$C_{12}$ alkoxyalkoxy, $C_5$-$C_6$ cycloalkoxy, $C_6$-$C_9$ aryloxy, $C_2$-$C_{13}$ alkylcarbonyloxy or $C_1$-$C_{12}$ alkylamino;
R[2] and R[3] are the same or different and are: hydrogen, $C_1$-$C_{12}$ alkoxy, $C_1$-$C_{12}$ alkyleneoxy, $C_4$-$C_{12}$ alkoxyalkoxy, $C_5$-$C_6$ cycloalkoxy, $C_2$-$C_{13}$ alkylcarbonyloxy, $C_1$-$C_{12}$ alkylamino, $C_1$-$C_{12}$ alkyl, $C_4$-$C_{12}$ alkoxyalkyl, $C_5$-$C_6$ cycloalkyl or $C_7$-$C_9$ aralkyl; and
Q is $C_2$-$C_6$ alkenylene, $C_5$-$C_8$ cycloalkylene, $C_5$-$C_8$ cycloalkenylene or of the formula:

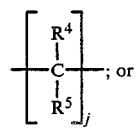  (I)

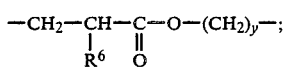  (II)

wherein j is a whole number between 0 and 6 inclusive; R[4] and R[5] are each independently hydrogen or $C_1$-$C_3$ alkyl; R[6] is hydrogen or methyl; and y is an integer between 2 and 5 inclusive; with the proviso that j can be 0 or 1 only if the saturated carbon backbone had pendent unsaturation prior to being substituted with the silane moiety;

said polymer having a viscosity average molecular weight of between about 500 and about 20,000;

(B) between 0 and about 300 parts by weight, per 100 parts by weight of component (A), of a filler; and (C) between 0 and about 10,000 parts by weight, per 100 parts by weight of component (A), of an inert diluent;

with the proviso that a total of at least about 1 part by weight of (B) plus (C) per 100 parts by weight of (A) is present; and (c) subjecting said coated substrate to curing conditions.

In yet another aspect, this invention is directed to a composite comprising a substrate coated in accordance with the method of this invention.

The moisture-curable polymer of this invention is an amorphous silane-substituted polymer having a saturated carbon backbone. As is employed herein, the term "saturated carbon backbone" refers to a chain of saturated carbon-to-carbon bonds, although said chain may have pendent, unsaturated sidechains substituted thereon. Moreover, as is employed herein, the term "amorphous" refers to polymers having no differential thermal analysis melting point above 50° C. The silane-substituted polymers of this invention are liquids at room temperature in the sense that they possess a definite volume and will ultimately assume the shape of their container.

The saturated carbon backbone of the silane-substituted polymer of this invention is typically selected from the group consisting of polyalphaolefin homo- or copolymers, ethylene/alphaolefin copolymer, ethylene/alphaolefin/nonconjugated polyene terpolymer, alphaolefin/polyene copolymer, and conjugated polyene homo- or copolymers. Preferably, such backbone is composed of ethylene/alphaolefin copolymer or ethylene/alphaolefin/nonconjugated polyene terpolymer. Particularly preferred backbones include ethylene/propylene copolymer and ethylene/propylene/nonconjugated diene terpolymer (EPDM).

The polyalphaolefin and conjugated polyene polymers that may be employed may be homopolymers or copolymers additionally comprising a minor amount of another monomer or monomers exhibiting vinyl unsaturation such as styrene, acrylate, methacrylate, acrylonitrile, methacrylonitrile and the like, provided that the presence of such other monomers does not detrimentally affect the characteristics of the grafted polymers.

The polyalphaolefin polymers that may form the backbone of the silane-substituted polymers of this invention are homo- or copolymers of one or more alpha-olefins having the formula $H_2C=CHR^7$ wherein $R^7$ is a linear or branched alkyl radial containing from 1 to 10 carbon atoms. Preferably, $R^7$ is $C_1$–$C_8$ alkyl. The most preferred alphaolefins are propylene, 1-butene and 1-pentene. In one preferred embodiment, the ethylene/alphaolefin copolymers further comprise alkyl- and/or aryl-substituted norbornene.

The ethylene/alphaolefin/nonconjugated polyene terpolymers which may be employed are polymers of ethylene, at least one alphaolefin (of the formula $H_2C=CHR^8$, wherein $R^8$ is a linear or branched alkyl radical comprised of from 1 to 10 carbon atoms) and at least one copolymerizable nonconjugated polyene. Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4 hexadiene, 1,7-octadiene, 1,9-decadiene, exo- and endo-dicyclopentadiene and the like; exo- and endo-alkenylnorbornenes, such as 5-propenyl-, 5-(buten-2yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propyl-norbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene content of the ethylene/alphaolefin copolymers and ethylene/alphaolefin/nonconjugated polyene terpolymers that may be employed is generally between about 25% and about 85%, is preferably between about 30% and about 75%, and is most preferably between about 40% and about 70%, all by weight. The polyene content of such terpolymers is generally below about 25%, and is preferably between about 2 and about 20%, all by weight.

The alphaolefin/polyene copolymers which may form the backbone of the silane-substituted polymers of this invention are copolymers of at least one alphaolefin having the formula $H_2C=CHR^9$, wherein $R^9$ is a linear or branched alkyl radical containing from 1 to 10 carbon atoms, and at least one conjugated or nonconjugated polyene. However, in the case of these copolymers and of conjugated polyene copolymers, it is to be noted that either polymerization should occur in a manner in which a saturated carbon chain is produced or the resultant polymers must be hydrogenated so that a saturated carbon chain is present.

Particularly preferred polymer backbones for the silane-substituted polymers of this invention are low molecular weight copolymers of ethylene, an alphaolefin and (optionally) a nonconjugated polyene, which copolymers have a viscosity index of at least about 75 and vinylidene-type terminal unsaturation. Such terminal unsaturation is considered to be pendent unsaturation for the purposes of this invention. These copolymers, which are disclosed in U.S. patent application Ser. No. 787,869 filed Oct. 16, 1985, now U.S. Pat. No. 4,668,834 the disclosure of which is herein incorporated by reference, are readily prepared employing metallocene catalysts such as $(C_5H_5)_2Zr(CH_3)_2$, $(C_5H_5)_2Ti(CH_3)_2$, $(C_5H_5)_2ZrCl_2$, $(CH_5H_5)_2TiCl_2$ and the like, in combination with linear or cyclic aluminoxane cocatalysts, such as methylaluminoxane.

The saturated carbon backbones employed in the composition of this invention have substituted thereon a sufficient amount of silane compound such that such polymers may be crosslinked upon exposure to curing conditions. Typically, there are between about 1 and about 70 silane groups per polymer chain. Preferably, between about 1 and about 15 silane groups per polymer chain are present. However, the composition of this invention may comprise a certain amount of non-silanated polymer such that there are an average of less than 1 silane group per polymer chain. Thus, in the composition of this invention the silane-substituted polymer component may comprise as low as about 0.5 silane moieties per chain.

The amorphous silane-substituted polymers of this invention possess a viscosity average molecular weight ($\overline{M}v$) of between about 500 and about 20,000, preferably of between about 750 and about 10,000, and most preferably of between about 1,000 and about 8,000.

The silane moieties which are substituted to the polymeric backbone of the polymers of this invention are of the formula:

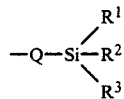

wherein
$R^1$ is: $C_1$–$C_{12}$ alkoxy, $C_1$–$C_{12}$ alkyleneoxy, $C_4$–$C_{12}$ alkoxyalkoxy, $C_5$–$C_6$ cycloalkoxy, $C_6$–$C_9$ aryloxy, $C_2$–$C_{13}$ alkylcarbonyloxy or $C_1$–$C_{12}$ alkylamino;
$R^2$ and $R^3$ are the same or different and are: hydrogen, $C_1$–$C_{12}$ alkoxy, $C_1$–$C_{12}$ alkyleneoxy, $C_4$–$C_{12}$ alkoxyalkoxy, $C_5$–$C_6$ cycloalkoxy, $C_2$–$C_{13}$ alkylcarbonyloxy, $C_1$–$C_{12}$ alkylamino, $C_1$–$C_{12}$ alkyl, $C_4$–$C_{12}$ alkoxyalkyl, $C_5$–$C_6$ cycloalkyl or $C_7$–$C_9$ aralkyl; and
Q is $C_2$–$C_6$ alkenylene, $C_5$–$C_8$ cycloalkylene, $C_5$–$C_8$ cycloalkenylene or of the formula:

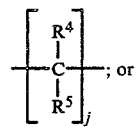

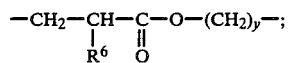

wherein j is a whole number between 0 and 6 inclusive; $R^4$ and $R^5$ are each independently hydrogen or $C_1$–$C_3$ alkyl; $R^6$ is hydrogen or methyl; and y is an integer between 2 and 5 inclusive; with the proviso that j can be 0 or 1 only if the saturated carbon backbone had pendent unsaturation prior to being substituted with the silane moiety.

It is to be noted that j can be 0 or 1 only if the carbon backbone had pendent unsaturation prior to being substituted with the silane moiety as it is necessary for either the silane compound (which is substituted onto the backbone to form the silane moiety) or the backbone to contain ethylene-type unsaturation (in the case of the backbone, such unsaturation is pendent off the saturated carbon chain) in order for substitution to occur. Hence, when j is 0 or 1, the silane moiety must be substituted where such pendent unsaturation off the saturated carbon backbone had been present, and not off the carbon backbone itself. In those cases where j is 2, 3, 4, 5 or 6, the silane moiety may be substituted on the saturated carbon backbone itself or on such a formerly ethylenically unsaturated pendent group.

Preferably, $R^1$ is $C_1$–$C_6$ alkoxy, $C_6$–$C_7$ aryloxy or $C_2$–$C_6$ alkylcarbonyloxy;
$R^2$ and $R^3$ are each independently $C_1$–$C_6$ alkoxy, $C_6$–$C_7$ alkylcarbonyloxy, or $C_1$–$C_6$ alkyl; and
Q is $C_2$–$C_5$ alkylene.

More preferably, $R^1$ is $C_1$–$C_3$ alkoxy or $C_2$–$C_3$ alkylcarbonyloxy;
$R^2$ and $R^3$ are each independently $C_1$–$C_3$ alkoxy, $C_2$–$C_3$ alkylcarbonyloxy or $C_1$–$C_3$ alkyl; and
Q is $C_2$–$C_5$ alkylene.

Most preferably, such silane moiety is derived from vinyl trimethoxysilane, vinyl triethoxysilane, vinyl triacetoxysilane or vinyl triisopropoxysilane.

The silane-substituted polymers of this invention may be prepared by contacting the polymeric backbone with an appropriate silane, at between about 60° and about 275° C., in the presence of a free radical generator such as organic hydroperoxide or peroxide, or an azonitrile. The free radical generator is generally employed in amounts between about 0.001 and about 50 percent by weight, based upon the weight of the backbone polymer. The term "appropriate silane" refers to a silane which when reacted with the backbone polymer in the presence of a free radical generator will produce a moiety of the formula described above. It is to be noted that an "appropriate silane" must contain at least one substituent including ethylene-type unsaturation (i.e., carbon to carbon double bond) unless the polymer backbone possesses pendent ethylene-type unsaturation.

Free radical generators which may be employed in carrying out the substitution reaction include aromatic or aliphatic (hydro)peroxides, including aromatic diacyl peroxides and aliphatic diacyl peroxides, dibasic acid peroxides, ketone peroxides, alkyl peroxyesters and alkyl hydroperoxides. Illustrative of the (hydro)peroxides which may be employed are diacetylperoxide, dibenzoyl peroxide, bis-2,4-dichlorobenzolyl peroxide, ditert-butyl peroxide, dicumylperoxide, tert.-butylperbenzoate, tert.-butylcumyl peroxide, 2,5-bis(tert.-butylperoxy) 2,5-dimethylhexane, 2,5-bis-(tert.-butylperoxy)-2,5-dimethylhexyne-3, 4,4,4',4'-tetra-(tert.-butylperoxyl)-2,2-dicyclohexylpropane, 1,4-bis-(tert.-butylperoxy)-3,3,5-trimethylcyclohexane, lauroyl peroxide, succinic acid peroxide, cyclohexanone peroxide, tert.-butyl peracetate, butyl hydroperoxide, and the like.

Free radical generators which are also suitable include azide-type compounds such as azidoformates, for example tetramethylenebis(azidoformate) and the like; aromatic polyazides such as 4,4'-diphenylmethane diazide and the like; and sulfonazides such as p,p'-oxybis(benzenesulfonyl azide) and the like. Particularly preferred free radical generators include di-t-butyl peroxide and dicumyl peroxide.

The compositions of this invention comprise: (A) the silane-substituted polymers described above; (B) between 0 and about 300 parts by weight of a filler; and (C) between 0 and about 10,000 parts by weight of an inert diluent; all such parts being based upon 100 parts by weight of component (A). At least about 1 part by weight of (B) and/or (C) per 100 parts by weight of (A) must be present.

The use of fillers is particularly desirable when the sealant compositions of this invention are to be employed as caulks. Illustrative of suitable fillers which may be employed are materials such as carbon black, clay, pumice, talc, calcium carbonate, silica, silicates, barytes and metal oxides such as titanium dioxide. Typically, preferably between about 1 and about 300 parts by weight, more preferably between about 5 and about 75 parts by weight, all based upon 100 parts by weight of the silane-substituted polymer present, of filler is employed. However, these proportions may vary somewhat depending upon the particular filler employed as well as on the particular substrate to be protected.

When the sealant compositions are to be employed for waterproofing surfaces, the use of a diluent is desirable in order to ensure an even application. Illustrative of the inert diluents which may be employed are vegetable oils, mineral oils, ester plasticizers and aromatic and aliphatic hydrocarbon solvents. Representative of such illustrative diluents are vegetable oils such as linseed oil, talloil and the like; mineral oils such as naphthenic and paraffinic distillates and the like; esters such as dibutyl phthalate, dioctyl phthalate, dioctyl adipate and the like; aromatic hydrocarbons such as benzene, toluene, xylene and the like; and aliphatic hydrocarbons such as hexane, octane, decane and the like.

Between 0 and about 10,000 parts by weight of diluent, based upon 100 parts by weight of silane-substituted polymer, are employed. The preferred amounts of diluent will depend upon the substrate to be protected, the substituted polymers employed and other similar factors, but such amounts may be readily determined by one skilled in the art employing routine experimentation.

In addition, if desired, a silanol condensation catalyst may also be blended into the composition of this invention. Suitable catalysts include metal carboxylates such as dibutylin dilaurate, stannous acetate, stannous octoate, lead naphthenate, zinc octoate, iron-2-ethylhexoate and cobalt naphthenate, organic metal compounds such as the titanium esters and chelates, for example tetrabutyl titanate, tetranonyl titanate and bis(acetylacetonyl)-di-isopropyl titanate, organic bases such as ethylamine hexylamine, dibutylamine and piperidine and acids such as the mineral acids and fatty acids. The preferred catalysts are the organic tin compounds, for example, dibutyltin dilaurate, dibutyltin diacetate and dibutyltin dioctoate. Typically, such catalysts are added in amounts up to about 3 parts by weight per 100 parts by weight of composition.

Moreover, the compositions of this invention may further comprise conventional additives such as stabilizers, processing aids, surfactants and the like.

Moreover, the polymers of this invention can also be compounded with hydrated salts such as $(CH_3COO_2.Ba.2H_2O)$, $BaCl_2.2H_2O$, $CaSO_4.2H_2O$, $CuSO_4.5H_2O$, $MgSO_4.7H_2O$, $Na_2B_4O_7.10H_2O$, and the like, to supply internal moisture where more rapid internal curing is necessary or where there is no trace atmospheric moisture.

The compositions of this invention are typically prepared by blending the components in any order employing conventional mixing apparatus. In order to avoid premature cure of the compositions they should be stored under low humidity conditions.

The process of this invention is typically performed as follows. A weatherable substrate is provided. At least a portion of the surface of such substrate is coated with the composition of this invention. The composition may be applied by any suitable conventional means, typically including spraying, extrusion from cartridges, troweling, and the like, depending upon the sealant composition to be employed and the substrate to be protected.

The applied composition is then subjected to curing conditions, which generally comprise ambient temperature and humidity, although higher temperature and/or humidity may be employed to achieve a more rapid cure if desired.

The composition of this invention may be used to protect a wide variety of weatherable substrates including wood, brick, concrete and the like. Because of the great flexibility of the cured compositions they are admirably suited for use on flexible substrates such as fibers, fabrics and the like.

Substrates coated in accordance with this invention will exhibit increased resistance to weathering.

EXAMPLES

The following Examples are intended to further illustrate the invention and are not intended to limit the scope of the invention in any manner whatsoever.

EXAMPLES 1–6

To a glass resin kettle equipped with a condensor, thermometer, nitrogen inlet-outlet tubes and stirrer were added vanadium-catalyzed ethylene/propylene copolymer or ethylene/propylene/dicyclopentadiene copolymer; silane adduct; and a free radical initiator. The amounts and types of copolymer, silane and initiator are all listed in Table I.

The reaction mixture was stirred for 3–5 hours at the temperature specified under a nitrogen blanket. Where no solvent was present, the reaction mixture was then vacuum stripped at 150° C. for 30–60 minutes. In the solvent based reaction (Example 4) the solvent was first distilled off at 60°–90° C. before the product was stripped as described above.

In Examples 1–3, the silane-substituted polymers so formed were formulated into a composition by combining 100 parts of silane-substituted polymer with 10 parts of fumed silica (Cabosil) and 0.3 parts of dibutyl in dilaurate. These compositions were cured for 45 days at room temperature and humidity and the resulting cured composition evaluated. The results of such testing are summarized in Table 1.

The silane-substituted polymers of Examples 4–6 were allowed to cure without being formulated. The tack free time and percent gel in xylene after boiling in water for 8 hours are listed in Table I.

TABLE I

| EXAMPLE NO. | 1 | 2 | 3 | 4 | 5 | 6 |
| --- | --- | --- | --- | --- | --- | --- |
| Polymer | E/P | E/P | E/P | E/P/DCPD | E/P/DCPD | E/P/DCPD |
| Wt % Propylene | 62 | 62 | 62 | 52 | 54 | 45 |
| Wt % Diene | None | None | None | 14 | 9 | 15 |
| Molecular Weight | 5100 | 5100 | 5100 | 5200 | 3400 | IV = 0.12[3] |
| Adducting Monomer[1] | VTMS | VTMS | VTMS | VTMS | VTAS | VTAS |
| Initiator | Di-t-Bu Peroxide | Di-t-Bi Peroxide | Di-t-Bu Peroxide | Benzoyl Peroxide | Dicumyl Peroxide | Di-t-Bu Peroxide |
| Recipe: | | | | | | |
| Polymer (grams) | 200.3 | 253.2 | 250.9 | 20 | 148 | 32.8 |
| Monomer (grams) | 20.0 | 25.4 | 8.8 | 4 | 14.8 | 4.9 |
| Initiator (grams) | 5.0 | 2.6 | 2.0 | 0.4 | 3.1 | 0.4 |
| Reaction Vessel Size (liters) | 1.0 | 1.0 | 1.0 | 0.25 | 1.0 | 0.25 |
| Reaction Temp, °C. | 150–160 | 150–160 | 150–160 | 65–70 | 140 | 150 |
| Solvent | None | None | None | n-hexane | None | None |
| Yield, (grams) | 196.0 | 272.9 | 256.7 | — | — | — |
| Unformulated Properties | | | | | | |

TABLE I-continued

| EXAMPLE NO. | 1 | 2 | 3 | 4 | 5 | 6 |
|---|---|---|---|---|---|---|
| Tack Free Time-Touch | —[4] | — | — | ~72 hr. | 48 hr. | 24 hr. |
| % Gel-Xylene After 8 Hr. Boiling H$_2$O | — | — | — | 74 | — | 63 |
| Formulated Properties[2] | | | | | | |
| Tack Free Time-ASTMC679 | <9 hr. | <6 hr. | <26 hr. | — | — | — |
| Durometer-Shore A | 43 | 28 | 9 | — | — | — |
| % Elongation | 40 | 40 | 70 | — | — | — |

[1] Adducting Monomer: VTMS = Vinyltrimethoxysilane; VTAS = Vinyltriacetoxysilane
[2] 100 phr silanated EP mixed with 10 phr Cabosil and 0.3 phr dibutyl tin dilaurate
[3] Intrinsic Viscosity in tetralin at 135° C.
[4] "—" indicates not tested These Examples demonstrate that the reaction of liquid EP and EPDM with silanes containing a substituent with an unsaturated carbon-carbon double bond as well as one or more other hydrolizable substituents produces a silanated liquid EP or EPDM adduct which crosslinks in the presence of moisture at room temperature, a result which is unexpected in view of Wouter and Woods', supra, conclusion that low molecular weight EP and EPDM have low moisture curing potential.

EXAMPLES 7–11

Employing a process identical to and on apparatus similar to those employed in Examples 1–6, several ethylene/propylene copolymers having vinylidene-type terminal unsaturation (within the scope of copending U.S. patent application Ser. No. 787,869, filed Oct. 16, 1985 now U.S. Pat. No. 4,668,834) were grafted with vinyl trimethoxysilane. The description of the starting polymers, amounts of reactants and analysis of the graft polymers formed are summarized in Table II.

TABLE II

| EXAMPLE NO. | 7 | 8 | 9 | 10 | 11 |
|---|---|---|---|---|---|
| Backbone Polymer | | | | | |
| Molecular Weight | 3000 | 3000 | 2920 | 1250 | 1300 |
| Wt % Propylene | 42 | 42 | 42 | 35 | 52 |
| Recipe: | | | | | |
| Backbone Polymer (grams) | 200 | 200 | 12,573 | 250 | 1300 |
| VTMS (grams) | 30 | 18 | 1132 | 37.5 | 195 |
| Di-t-Butyl Peroxide (grams) | 4 | 4 | 252 | 5.0 | 26 |
| Reaction Vessel Size | 500 ml | 500 ml | 5 gal | 500 ml | 3 liter |
| Yield (grams) | 227.1 | 214.7 | 13,688 | 281.2 | 1490.5 |
| % VTMS Reacted* | 90.3 | 81.7 | 98.5 | 83.2 | 97.6 |
| Silane-substituted polymer | | | | | |
| Molecular weight | ~5000 | 5130 | 5510 | 1540 | 1370 |
| Silane Adducts/ Polymer Chain | ~4 | 2.3 | 3.0 | 1.2 | 1.2 |

*Determined by mass-balance calculation

These Examples demonstrate the high efficiency with which silanes containing a carbon-carbon double bond and one or more hydrolizable substituents, in general, and vinyltrimethoxysilane, in particular, react with liquid EP copolymers.

EXAMPLE 12 and COMPARATIVE EXPERIMENT A

A Parr-type 2 liter stainless steel, high pressure reactor was charged with 900 grams of an ethylene/propylene copolymer having terminal vinylidene-type unsaturation (58 weight percent propylene, 1860 $\overline{M}v$), 108 grams of vinyltrimethoxysilane, and 45 grams dicumyl peroxide (92% active). The mixture was stirred at 160° C. under a nitrogen blanket for 2 hours and then vacuum stripped.

The resulting silanated EP adduct was dissolved at 9.7% solids in a hydrocarbon solvent (Isopar E, available from Exxon Chemical Company). Dibutyltin dilaurate was added at 0.8 parts by weight per 100 parts of silane-substituted polymer in order to more rapidly effect the moisture cure. A 10.5% solids solution of the non-substituted ethylene/propylene copolymer was also prepared in Isopar E (Comparative Experiment A).

These formulations were applied to concrete and brick at similar coverage rates, and the protected substrates soaked in water for various periods of time. Table III shows that the silanated polymer was much more efficient in reducing the water absorption of both concrete and brick than was the unsubstituted polymer.

TABLE III

| Example or Comparative Experiment | Coating | Concrete* | Brick* |
|---|---|---|---|
| — | None | 7.1 (24 hours) | 7.7 (24 hours) |
| A | Non-substituted E/P copolymer | 6.6 (48 hours) [−7]** | 8.5 (48 hours) [+10] |
| 1 | Silane-substituted E/P copolymer | 2.6 (48 hours) [−63] | 2.0 (48 hours) [−74] |

*Percent weight increase after soaking in water for period of time indicated in parentheses.
**Bracketed numbers indicate increase in weight of coated sample after 48 hours relative to increase in weight of uncoated sample after 24 hours.

EXAMPLES 13–18

The silanated EP adducts in Examples 13–18 were prepared according to the procedure described in Examples 1 through 6. A 500 ml resin kettle was charged with 150 grams of an ethylene/propylene copolymer having terminal vinylidene-type unsaturation (42 weight percent propylene, 2920 $\overline{M}v$), 3 grans of di-t-butyl peroxide, and the amount of vinyltrimethoxysilane specified in Table IV.

The resulting silanated EP adducts were formulated into masonry coatings by dissolving them to 10% solids in a hydrocarbon solvent (Isopar G, available from Exxon Chemical Company) and adding 1 part dibutyl tin dilaurate per 100 parts silanated polymer.

Table IV shows the effects of the vinyltrimethoxysilane level on the water absorption characteristics of concrete, brick and wood blocks coated with silane-substituted ethylene/propylene copolymers.

TABLE IV

| EXAMPLE | 13 | 14 | 15 | 16 | 17 | 18 |
|---|---|---|---|---|---|---|
| Parts Vinyltrimethoxy- | 3 | 6 | 9 | 12 | 15 | 25 |

TABLE IV-continued

| EXAMPLE | 13 | 14 | 15 | 16 | 17 | 18 |
|---|---|---|---|---|---|---|
| silane | | | | | | |
| Gms VTMS Added to Reactor | 4.5 | 9 | 13.5 | 18 | 22.5 | 37.5 |
| Water Absorption* - Concrete | | | | | | |
| % Wt Increase - 48 hr H$_2$O | 4.1 | 1.49 | 1.70 | 0.97 | 0.73 | 0.85 |
| % Reduction** | 45 | 80 | 76 | 83 | 90 | 89 |
| Water Absorption* - Brick | | | | | | |
| % Wt Increase - 48 hr H$_2$O | 0.70 | 0.76 | 0.57 | 0.31 | 0.53 | 0.66 |
| % Reduction** | 91 | 91 | 93 | 96 | 94 | 92 |
| Water Absorption* - Wood | | | | | | |
| % Wt Increase - 48 hr H$_2$O | 33.3 | 21.5 | 22.6 | 23.8 | 12.7 | 21.0 |
| % Reduction** | 29 | 54 | 52 | 49 | 73 | 55 |

*All materials applied as 1 coat from 10% solids formulation
**% Reduction = For concrete and brick, reduction in weight increase of coated blocks after 48 hours relative to that of noncoated blocks soaked 24 hours. Uncoated concrete showed a 7.4% weight increase after 24 hours while uncoated brick increased 8.1%. For wood, reduction in weight increase of coated cedar blocks relative to that of uncoated blocks, both soaked 48 hours. Uncoated cedar blocks increased in weight by 46.8% after 48 hours.

EXAMPLE 19

The silane-substituted ethylene/propylene copolymers of Examples 7 and 10 were formulated into a 20% solids coatings using a hydrocarbon solvent (Isopar G) and 1 part by weight per 100 parts of silane-substituted polymer dibutyltin dilaurate. These coatings were applied to concrete slabs at a coverage rate of 227 ft$^2$/gallon. Prior to coating, it was determined that the uncoated concrete slabs increased in weight by an average of 11.2% after soaking in water for 24 hours.

The results in Table V indicate that the lower molecular weight silane-substituted copolymer provided equivalent waterproofing to the higher molecular weight adduct. In addition, the low molecular weight adduct penetrated more deeply into the concrete and gave a more natural surface appearance, although each provided desirable protection for such an irregularly surfaced substrate.

TABLE V

| Example No. | 7 | 10 |
|---|---|---|
| Mv - Silanated EP Adduct | ~5000 | 1540 |
| % Wt. Increase - Coated Concrete After 48 Hour H$_2$O Soak | 1.8 | 1.8 |
| Concrete Appearance After Coating | Dark | Natural |
| Penetration Depth; inch | ≦1/16 | ⅛-¼ |

EXAMPLE 20

This Example demonstrates the use of silane-substituted ethylene/propylene copolymers as permanent water repellants for cloth fabrics.

A coating based on the silane-substituted low molecular weight ethylene/propylene copolymer in Example 9 was prepared by dissolving 100 parts of the substituted copolymer, and 1 part dibutyl tin dilaurate in 900 parts hydrocarbon solvent (Isopar G). One coat of this formulation was applied to one half the surface area of 10 inch by 6 inch unbleached muslin fabric which had been washed with detergent solution, stretched on a drying rack and dried for 15 minutes at 110° C. The remaining half of the fabric was treated with one coat of Isopar G. After the solvent had evaporated at room temperature, the sample was dried for fifteen minutes at 60° C. and cured for 3 days at room temperature and humidity.

Water droplets placed on the fabric treated with Isopar G were absorbed by the fabric within 3 minutes. Water droplets placed on the fabric treated with the silane-substituted low molecular weight ethylene/propylene copolymer were not absorbed by the fabric even after 15 minutes. The breathability of the muslin treated with the silanated copolymer was maintained. Washing five times with trichloroethylene to simulate dry cleaning did not destroy the water repellancy of the fabric treated with the silanated copolymer.

EXAMPLE 21

This Example illustrates the use of silane-substituted low molecular weight ethylene/propylene copolymers as moisture curing, room temperaure vulcanizing (RTV) sealants and caulks.

A 12 liter resin kettle was charged with 2300 grams of ethylene/propylene copolymer (44 weight percent propylene, 4200 $\overline{M}v$), 500 grams xylene, 115 grams vinyltrimethoxysilane and 18.4 grams di-t-butylperoxide. The vessel was closed and flushed with nitrogen. The mixture was mechanically stirred for 30 minutes at room temperature to obtain a uniform mixture. The temperature was raised to 150° C. and held there for 5 hours under a nitrogen atmosphere. The volatiles were removed by vacuum stripping.

The resulting silane-substituted copolymer had a viscosity average molecular weight ($\overline{M}v$) of 4300 and a room temperature Brookfield viscosity of 327,000 cps. Tack free time by touch of the unformulated, silanated polymer was 48 hours at room temperature and 100% relative humidity.

The silane-substituted copolymer prepared above was formulated into the following RTV sealant receipe:

| | Parts By Weight |
|---|---|
| Silanated Adduct | 100 |
| Hydrocarbon Solvent (Isopar G) | 12.7 |
| Cabosil (fumed silica) | 12.7 |
| Adhesion Promoter (aminopropyl-triethoxysilane) | 0.89 |
| Phenolic Antioxidant (Irganox 1076) | 0.25 |
| Dibutyl tin dilaurate Catalyst | 0.25 |

The RTV sealant was prepared in a double planetary mixer equipped so that the mixing chamber could be evacuated and using the following schedule:

| Time (min.) | Operation | Speed |
|---|---|---|
| 0 | Add Adduct, Solvent | 20 rpm |
| 20 | Add Cabosil, AO, Silene | 50 |
| 23 | Apply Vacuum | 50–70 |
| 35 | Add Catalyst, continue vacuum | 50–70 |
| 65 | Break w/N$_2$ Sweep | 50–70 |

The sealant formulated and mixed as above was odorless before and after curing, and had better clarity than a commercial silicone RTV sealant. In sections of 174 inch thick or less, the silance-substituted RTV sealant of this invention was transparent to visible light whereas the commercial silicone sealant was translucent to opaque. Tack free time (touch) was 27 hours at room temperature and 55% relative humidity. The cured sealant exhibited an elongation of 180% and excellent peel adhesion to an untreated concrete substrate.

What is claimed is:

1. A method for protecting a weatherable substrate, which method comprises the steps:

(a) providing a weatherable substrate;

(b) applying to at least a portion of said weatherable substrate a moisture curable composition comprised of:

(A) an amorphous polymer comprising a saturated carbon backbone having substituted thereon one or more silane moieties of the formula:

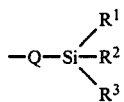

wherein $R^1$ is: $C_1$-$C_{12}$ alkoxy, $C_1$-$C_{12}$ alkyleneoxy, $C_4$-$C_{12}$ alkoxyalkoxy, $C_5$-$C_6$ cycloalkoxy, $C_6$-$C_9$ aryloxy, $C_2$-$C_{13}$ alkylcarbonyloxy or $C_1$-$C_{12}$ alkylamino;

$R^2$ and $R^3$ are the same or different and are: hydrogen, $C_1$-$C_{12}$ alkoxy, $C_1$-$C_{12}$ alkyleneoxy, $C_4$-$C_{12}$ alkoxyalkoxy, $C_5$-$C_6$ cycloalkoxy, $C_2$-$C_{13}$ alkylcarbonyloxy, $C_1$-$C_{12}$ alkylamino, $C_1$-$C_{12}$ alkyl, $C_4$-$C_{12}$ alkoxyalkyl, $C_5$-$C_6$ cycloalkyl or $C_7$-$C_9$ aralkyl; and Q is $C_2$-$C_6$ alkenylene, $C_5$-$C_8$ cycloalkylene, $C_5$-$C_8$ cycloalkenylene or of the formula:

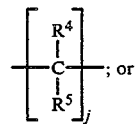

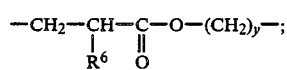

wherein j is a whole number between 0 and 6 inclusive; $R^4$ and $R^5$ are each independently hydrogen or $C_1$-$C_3$ alkyl; $R^6$ is hydrogen or methyl; and y is an integer between 2 and 5 inclusive, with the proviso that j can be 0 or 1 only if the saturated carbon backbone had pendent unsaturation prior to being substituted with such silane moiety;

said polymer having a viscosity average molecular weight of between about 500 and about 20,000;

(B) between 0 and about 300 parts by weight, per 100 parts by weight of component (A), of a filler; and (C) between 0 and about 10,000 parts by weight, per 100 parts by weight of component (A), of an inert diluent;

with the proviso that a total of at least 1 part by weight of (B) plus (C) per 100 parts by weight of component (A) is present; and (c) subjecting said coated substrate to curing conditions.

2. A method in accordance with claim 1 wherein said filler is selected from the group consisting of carbon black, clay, pumice, talc, calcium carbonate, silica, silicates, barytes and metal oxides.

3. A method in accordance with claim 1 wherein said inert diluent is selected from the group consisting of vegetable oils, mineral oils, ester plasticizers and aromatic and aliphatic hydrocarbon solvents.

4. A method in accordance with claim 1 wherein the saturated carbon backbone is a polymer selected from the group consisting of ethylene/alphaolefin copolymers and ethylene/alphaolefin/nonconjugated diene terpolymers.

5. A method in accordance with claim 1 wherein the saturated carbon backbone is selected from the group consising of ethylene/propylene copolymers and ethylene/propylene/nonconjugated diene terpolymers.

6. A method in accordance with claim 4 wherein $R^1$ is $C_1$-$C_6$ alkoxy, $C_6$-$C_7$ aryloxy or $C_2$-$C_6$ alkylcarbonyloxy; $R^2$ and $R^3$ are each independently $C_1$-$C_6$ alkoxy, $C_6$-$C_7$ alkylcarbonyloxy, or $C_1$-$C_6$ alkyl, and Q is $C_2$-$C_5$ alkylene.

7. A method in accordance with claim 6 wherein $R^1$ is $C_1$-$C_3$ alkoxy or $C_2$-$C_3$ alkylcarbonyloxy, $R^2$ and $R^3$ are each independently $C_1$-$C_3$ alkoxy, $C_2$-$C_3$ alkylcarbonyloxy, or $C_1$-$C_3$ alkyl, and Q is $C_2$-$C_5$ alkylene.

8. A method in accordance with claim 7 wherein said polymer has a viscosity average molecular weight of between about 750 and about 10,000.

9. A method in accordance with claim 8 wherein said polymer has a viscosity average molecular weight of between about 1,000 and about 8,000.

10. A method in accordance with claim 1 wherein said substrate is wood.

11. A method in accordance with claim 1 wherein said substrate is concrete.

12. A method in accordance with claim 1 wherein said substrate is brick.

13. A method in accordance with claim 1 wherein said substrate is fabric.

14. A composite comprising a substrate coated in accordance with the method of claim 1.

15. A composite in accordance with claim 14 wherein said substrate is wood.

16. A composite in accordance with claim 14 wherein said substrate is concrete.

17. A composite in accordance with claim 14 wherein said substrate is brick.

18. A composite in accordance with claim 14 wherein said substrate is fabric.

* * * * *